United States Patent [19]

Mayra

[11] 3,998,257
[45] Dec. 21, 1976

[54] SKID PREVENTER FOR VEHICLE TIRES

[76] Inventor: Matti V. V. Mayra, Myllykatu 2, 41160 Tikkakoski, Finland

[22] Filed: Mar. 20, 1975

[21] Appl. No.: 560,492

[30] Foreign Application Priority Data

Mar. 25, 1974 Finland .............................. 902/74

[52] U.S. Cl. .............................. 152/210; 152/169
[51] Int. Cl.² ........................................ B60C 11/14
[58] Field of Search .......... 152/208, 210, 212, 167, 152/168, 169; 36/59 B

[56] References Cited

UNITED STATES PATENTS

| | | | |
|---|---|---|---|
| 2,460,003 | 1/1949 | Gemeny | 152/210 |
| 3,098,516 | 7/1963 | Vasiljevic | 152/210 |
| 3,831,655 | 8/1974 | Cantz | 152/210 |
| 3,889,735 | 6/1975 | Salakari | 152/210 |

FOREIGN PATENTS OR APPLICATIONS 433,312  8/1926  Germany ............................ 152/210

*Primary Examiner*—Drayton E. Hoffman
*Attorney, Agent, or Firm*—McGlew and Tuttle

[57] ABSTRACT

A skid-preventing device includes a stud which is embeddable into the rubber tread of a vehicle tire and comprises a cylindrical stem portion and a bottom flange portion affixed to the base of the stem portion. A hard metal rod engaging pin is affixed to the end of the stem portion opposite the base. A locking ring is engaged over the stem portion between the flange and the pin. The locking ring is of slightly larger diameter than the hole provided in the tire tread for the stud, thus the stud is retained in the tread hole by the frictional force of the locking ring against the inner wall of the hole.

7 Claims, 6 Drawing Figures

SKID PREVENTER FOR VEHICLE TIRES

Lately attention has increasingly been directed to the desirability of minimizing damage to road surfaces caused by the skid preventers utilized in the rubber tires of vehicles. The majority of skid preventers have in the past been designed to dig deeply into the road surfaces, the stabbing force applied to these surfaces being of the order of from 15 to 20 thousand pounds or greater. Substantial reduction of the stabbing force in the heretofore known studs would result in the non-achievement of the basic purpose for such skid preventer that is that the vehicle should be under control in any circumstance. If the skid stud is attached to the rubber of the tire for instance, by means of a plurality of relatively larger diameter sharp edged flanges and bosses formed in the stud, in a very firm manner, so that the stud is constricted in its movement with respect to the road surface, the result is that the stabbing force will be relatively high. If on the other hand the mobility of the skid preventer in the tire tread is increased, the result is that the rubber will rapidly deflocculate around the flanges of the skid preventer and a fairly rapid disengagement of the skid preventer from the tread will result. The running in of such skid preventers also presents problems because the skid preventer when running will readily tilt, thus being unable to function in the desired manner and also may be ejected from the tire tread.

SUMMARY OF THE INVENTION

The present invention provides a skid preventer that meets the present requirements, that is having a low stabbing force upon the road surface, such stabbing force additionally being easily adjustable within certain limits, the skid preventer however remaining securely attached to the tire tread.

In accordance with the present invention there is provided a tire stud having a substantially cylindrical stem portion, a flange portion at one end of the stem portion with a diameter larger than the stem portion, a hard metal pin at the other end of the stem portion for biting into the road surface and a loosely fitting ring about the stem portion in the vicinity of the flange portion. The stem with its ring is shot into a hole provided in the tire tread. The ring is provided with a diameter slightly larger than the tread hole and flange so that upon insertion into the tread, the stud is secured in place by the frictional forces of the ring on the tread hole wall. The inner diameter of the ring is smaller than the outer diameter of the flange so that the stud is retained in the hole.

DESCRIPTION OF PREFERRED EMBODIMENTS

Figure 1:
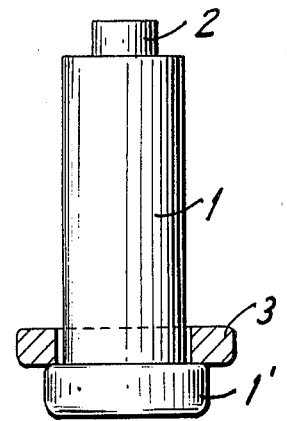
FIG. 1 shows a skid preventer according to the invention on an enlarged scale.

The skid preventer according to the invention comprises a rivet-like stud, having a stem portion 1 of substantially constant thickness and provided at one end with a base flange 1' and at an opposite or outer end, with a hard metal pin 2. The stem portion 1 together with its base flange may be of solid material or of sleeve-like construction.

The stem portion is loosely surrounded, by a locking ring 3 having an outer diameter larger than that of the base flange and a central hole through which the stem portion 1 can be pushed until the base flange 1' engages the locking ring 3. During operation the locking ring 3 is entirely loose with respect to the stem portion and to the base flange 1', but it may be initially fixed to the base flange by means of, for instance, an adhesive so that during storage and insertion into the tire it will form a single body easily handled as an integrated unit. The temporary attachment must however be readily disengageable, since the basic principle of the invention requires the locking ring 3 and the stem 1 to be in spaced relationship with each other. When the skid stud, together with its temporarily attached or completely loose locking ring 3, is shot, by means of a stud pistol, into a hole in the tread, the impact force is applied to the free surface of the locking ring, whereby the parts 1 and 3 are simultaneously placed into position. In addition the optional attachment between the parts is selected so that the attachment will be disengaged during the insertion operation.

Since the skid stud stem 1 and the locking ring 3 in the tread are loose with respect to each other, the locking ring, because of its larger diameter, will attach itself relatively firmly to the side surface of the hole. Contrarily the base flange 1' will not be attached very firmly to the side surface of the hole since its outer diameter is smaller than that of the locking ring 3. This enables the stem portion 1 with its base flange 1' to move fairly freely with respect to the fixedly attached locking ring 3 in the tread when the stud hits a road surface, thus minimizing the stabbing force. On the other hand the stem portion is prevented from being ejected from the vehicle tire by the fixed locking ring 3, which serves as a retaining ring. Experiments have further shown that the locking ring has a guiding effect on the stem portion, preventing lateral tilting thereof.

The diameter of the base flange 1' and that of the locking ring 3 and their respective thicknesses may be selected so that the stabbing force will have a desired value. It has been found that when the diameter of the base flange 1' is for instance about 6 millimeters and that of the locking ring 3 is greater by a couple of millimeters, the stabbing force will be of the order of 10 thousand pounds or less. The magnitude of the stabbing force is however also dependent on the diameter of the stem portion 1 and the quality of the rubber nesting tightly against the peripheral surface of the stem portion. No rubber breakage has been observed during the experiments by virtue of the fact that no sharp edges are needed in the skid preventer proper 1,1' for biting in the rubber. By virtue of the great length and the even diameter of the stem portion there is provided the additional advantage that no clearance will be formed between the stem portion and the rubber for snow and gravel to penetrate as is likely to occur particularly in the case of multi-flanged skid preventers.

Figure 2:
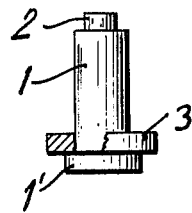
FIGS. 2 through 6 show further embodiments of the invention.
Figure 3:
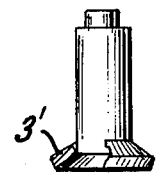
Figure 4:
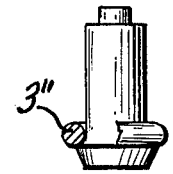
Figure 5:
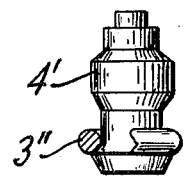
Figure 6:
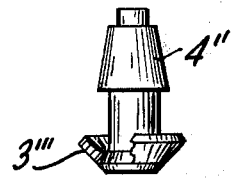

FIGS. 2 to 6 illustrate various further embodiments of the invention. FIG. 2 is substantially similar to FIG. 1. In FIG. 3 the edges of the flange and the face is formed with an outward and downward inclination, the locking ring correspondingly comprising a ring 3' in the form of a downwardly diverging frustrated cone. In FIG. 4 the locking ring comprises a ring 3'' with a circular cross section positioned upon a base flange correspondingly grooved at its upper surface. A similar arrangement is shown in FIG. 5 with the addition that the stem portion approximately at its midpoint is provided with a boss 4' in the form of a double cone. A locking ring 3''' in the form of an upwardly diverging frustrated cone, is shown in FIG. 6 placed against the upper surface of a base flange in the form of a double cone. This embodiment has at the outer end of the stem portion a boss 4'' in the form of a downwardly diverging frustrated cone. In the embodiments shown in FIGS. 5 and 6 the diameter of the central bore of the locking ring 3 is smaller than the outer diameter of the bosses 4',4'' and of the base flange of the stem portion 1, and therefore the locking ring 3 is formed as a split ring which when flared open can be slipped onto the stem portion. In the embodiments shown in the last mentioned two figures the stem portion together with its base flange may slide downward with respect to the locking ring a distance determined by the location of the boss on the stem portion 1.

I claim:

1. A stud which is insertable into the rubber tread of a vehicle tire, comprising a cylindrical stem portion having a base end insertable into the tire and an outer end adapted to extend out of the tire, a cylindrical flange portion affixed to said base end of said stem portion and substantially concentric with said stem portion and having an annular top surface, a hard metal pin affixed to said outer end of said stem portion, an annular locking ring on said stem portion between said flange and said pin being of a thickness substantially the same as said flange portion and having a bottom surface with a portion in contact with and of substantially the same configuration as a part of the top surface of said flange portion, said locking ring being supportable on said flange portion and having an inner diameter slightly larger than said stem and smaller than the exterior diameter of said flange and having an outer diameter larger than the outer diameter of said flange, said locking ring being adapted to engage the tire, said stem including an intermediate portion of greater diameter than the remaining portion of said stem and the inner diameter of said ring so that said ring is confined for movement between said intermediate portion and said flange.

2. A stud according to claim 1, wherein said locking ring comprises a disc member having a circularly cylindrical configuration.

3. A stud according to claim 1, wherein said locking ring has a peripheral phase which is bevelled from said flange inwardly toward said stem.

4. A stud according to claim 1, wherein said locking ring comprises an annular member having a circular cross section.

5. A stud according to claim 1, wherein said flange has an annular peripheral surface bevelled outwardly toward said metal pin.

6. A stud according to claim 1, wherein at least a portion of the intermediate portion of said stud is bevelled outwardly in a direction from said pin toward said flange.

7. A stud according to claim 1, wherein said locking ring has an outer annular surface which is bevelled inwardly toward said stem and inwardly toward said flange, said locking ring having a hollow portion on the end thereof facing said pin.

* * * * *